Sept. 11, 1956      G. F. GARDNER      2,762,182
DISC HARROW

Filed July 5, 1952      4 Sheets-Sheet 1

INVENTOR.
GUY F. GARDNER
BY Carlson, Pitzner,
Hubbard & Wolfe
ATTORNEYS

Sept. 11, 1956   G. F. GARDNER   2,762,182
DISC HARROW

Filed July 5, 1952   4 Sheets-Sheet 2

INVENTOR.
GUY F. GARDNER
BY Carlson, Pitzner,
Hubbard & Wolfe
ATTORNEYS.

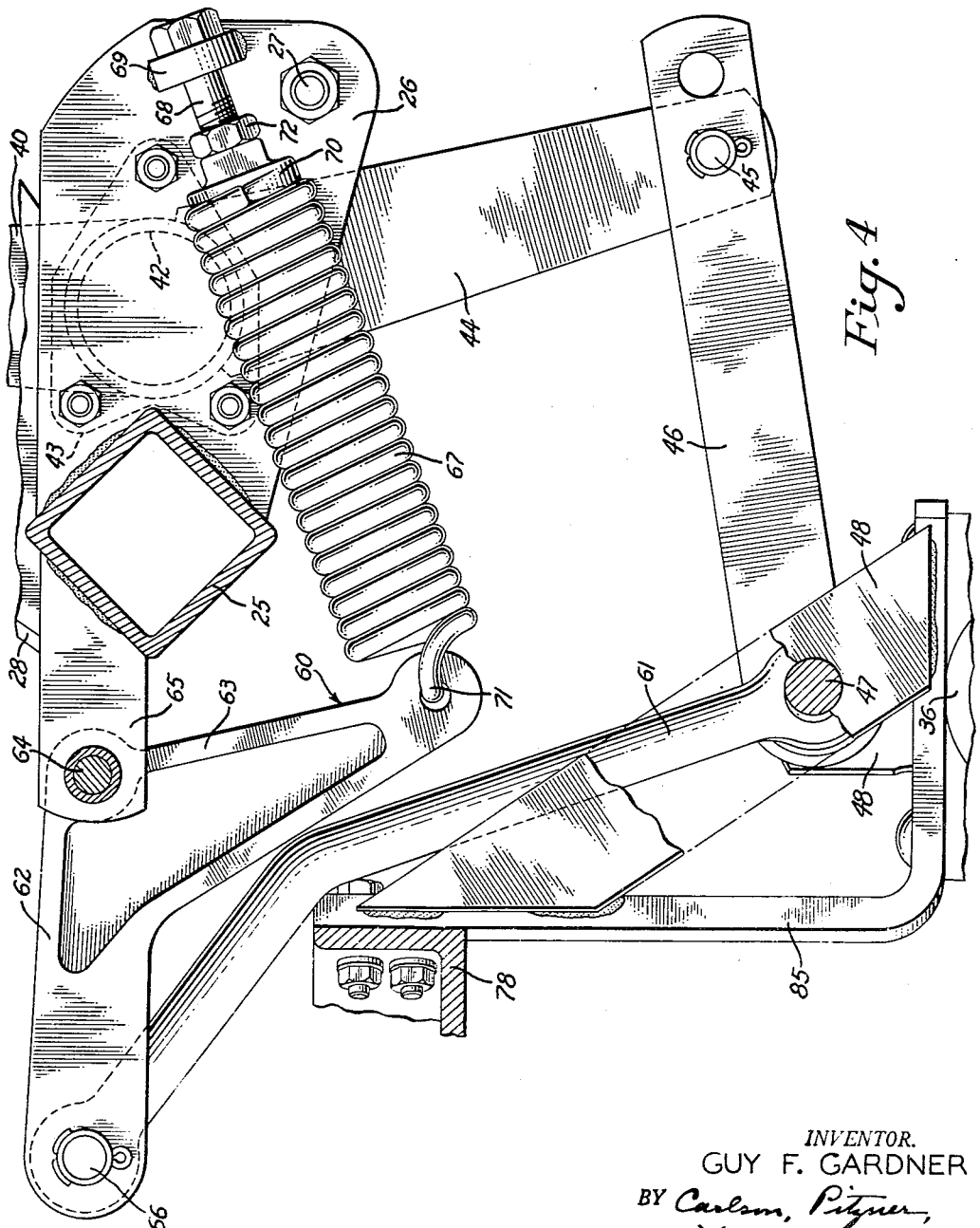

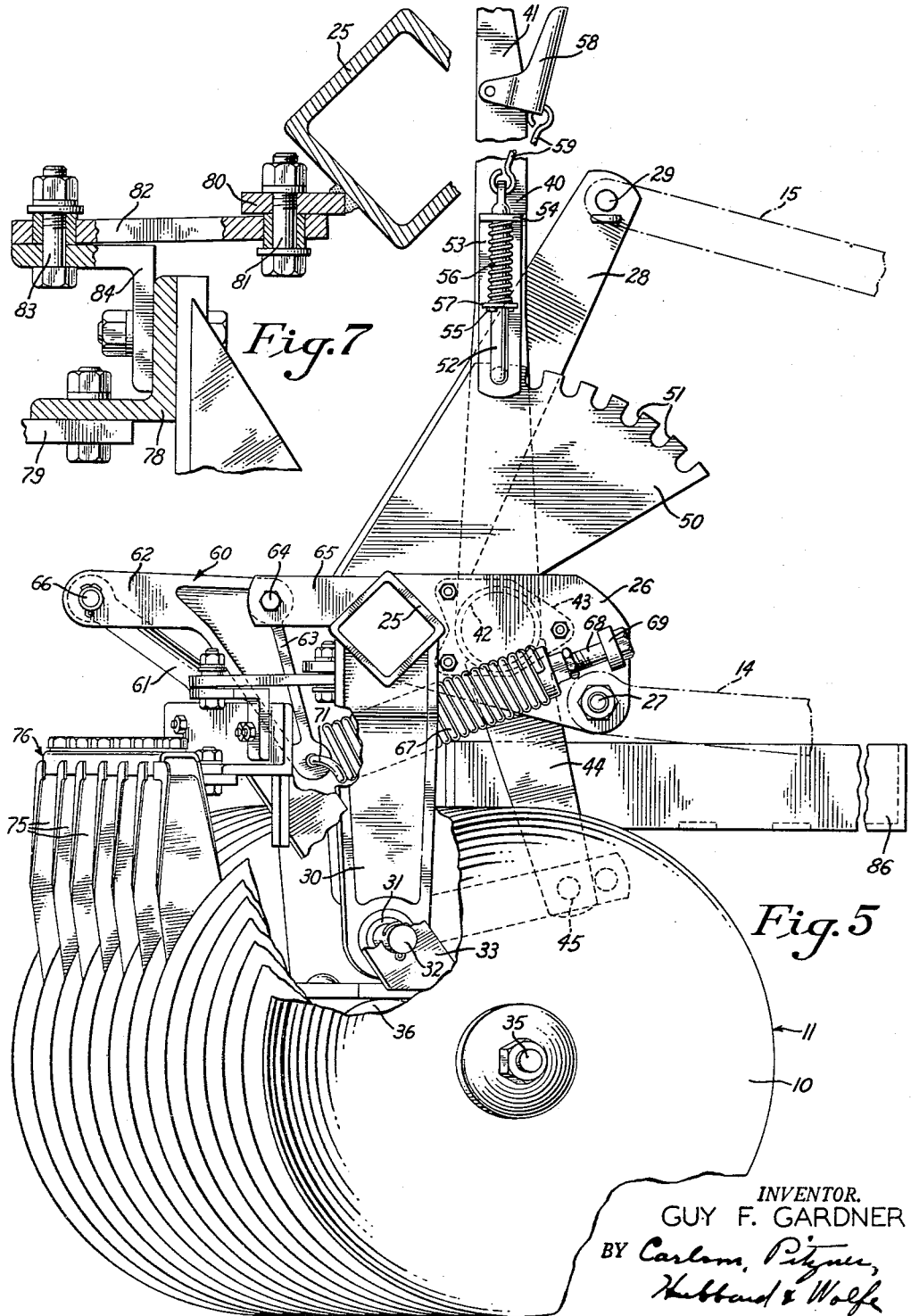

United States Patent Office 2,762,182
Patented Sept. 11, 1956

2,762,182

DISC HARROW

Guy F. Gardner, Dearborn, Mich., assignor to Harry Ferguson, Inc., Detroit, Mich., a corporation of Delaware Application July 5, 1952, Serial No. 297,209

3 Claims. (Cl. 55—81)

The invention relates to agricultural implements of the type adapted to be mounted on a tractor, and more particularly to an improved tractor-mounted disc harrow.

One object of the invention is to provide a tractor-mounted adjustable disc harrow characterized by its simplicity and ruggedness, by its efficiency and reliability in operation, and which can be manufactured at relatively low cost.

Another object is to provide novel mechanism by which the tractor operator, without dismounting from the tractor, may easily, conveniently, and safely adjust the disc gangs through their full range of movement.

Another object is to provide novel mechanism for automatically adjusting the pressure exerted on the inner ends of the gangs of the harrow in accordance with the angular position in which they are set for operation.

A further object is to improve the construction of the harrow to permit closer coupling with the tractor so as to reduce the overhanging weight to a minimum and thus enable more accurate response to changes in the draft load to be obtained for operating the control mechanism on the tractor.

Other objects and advantages of the invention will become apparent from the following detailed description of the preferred embodiment illustrated in the accompanying drawings in which:

Fig. 4 is an enlarged sectional view taken transversely of the harrow in offset vertical planes substantially on the lines 4—4 of Fig. 3;

Fig. 5 is an enlarged side view of the harrow with parts broken away to show details of the adjusting mechanism;

Fig. 7 is a sectional view taken in offset vertical planes substantially on the lines 7—7 of Fig. 6.

For purposes of illustration, the invention has been shown and will be described herein as embodied in a disc harrow designed for use especially with a tractor equipped with a three-point power actuated hitch linkage such as the "Ferguson" tractor. It will be appreciated by those skilled in the art that various changes or modifications may be made in the form, construction and arrangement of the parts of the harrow without departing from the spirit and scope of the invention as expressed in the appended claims. It will also be appreciated that the harrow may be constructed and arranged for attachment to other types of tractors.

Figure 1:
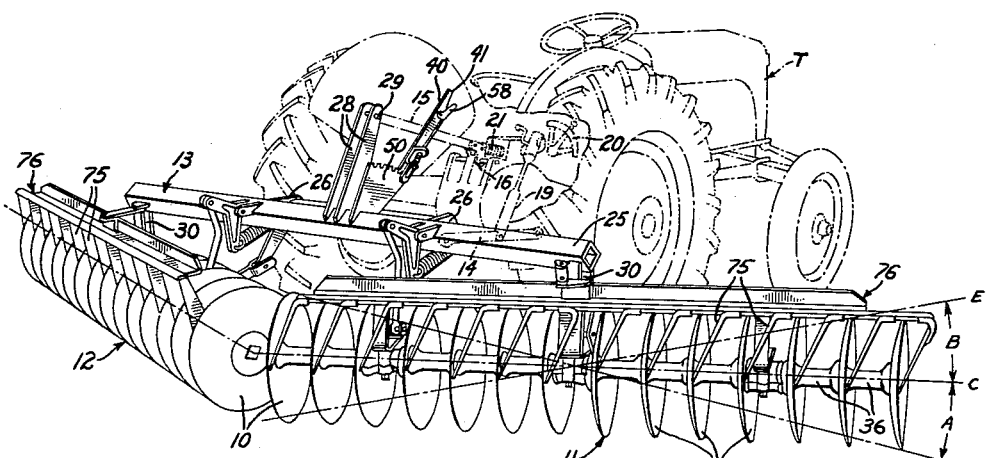
Fig. 1 is a perspective view of a disc harrow embodying the features of the invention, the harrow being shown coupled to a tractor.
Figure 2:
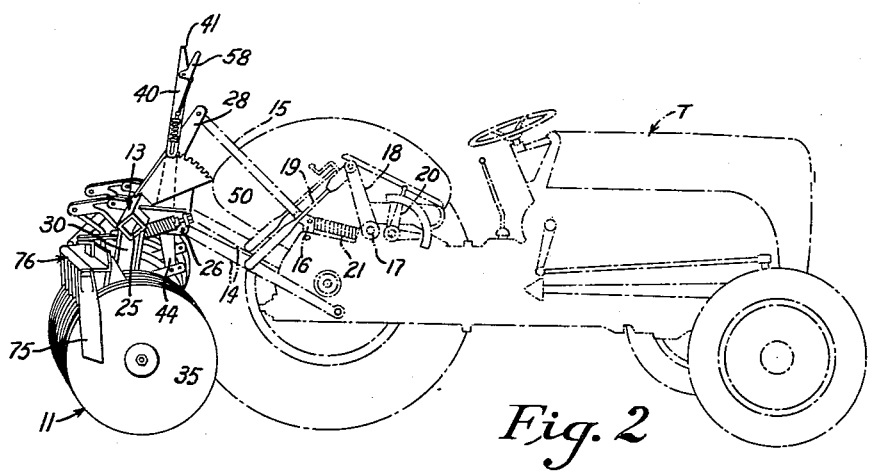
Fig. 2 is a side view of the harrow and tractor shown in Fig. 1, with the harrow in a raised or transport position.

Referring to Figs. 1 and 2 of the drawings, the harrow selected to illustrate the invention is of the type commonly known as a single disc harrow having a series of discs 10 arranged in two groups or gangs 11 and 12, respectively, pivotally supported at opposite sides of a frame structure 13 adapted to be trailingly attached to a tractor T. The tractor T shown is a light weight, four-wheel agricultural tractor equipped with a vertically swingable hitch linkage adapted to be raised and lowered by a power unit on the tractor. The power unit and the controls therefor may be of the general type disclosed in Ferguson Patent No. 2,118,180, issued May 24, 1938, to which reference may be had for details of construction.

For present purposes it is sufficient to note that the hitch linkage provided on the tractor comprises a pair of laterally spaced lower draft links 14 universally pivoted at their forward ends on the rear portion of the tractor body. Also included in the linkage is an upper or top link 15 pivoted at its forward end to a shackle 16 which in turn is pivoted on the upper rear portion of the tractor body. The draft links 14 are adapted to be raised or lowered in unison by the power unit on the tractor through the medium of a rock shaft 17 journaled on the tractor body and having crank arms 18 at opposite ends connected with the draft links by drop links 19. Control of the power unit is effected in a well-known manner by means of a hand lever 20, commonly called the quadrant lever, and a shiftable control member (not shown) connected to the shackle 16 for movement by force applied through the top link 15 against the biasing action of a main control spring 21.

In the preferred form of the harrow the frame 13 comprises an elongated rigid bar 25, herein shown as hollow and substantially square in cross section. For connection with the particular tractor illustrated, two forwardly projecting brackets 26 are welded or otherwise suitably attached to the bar 25 in laterally spaced relation. Each bracket carries an inwardly projecting pin 27 (Figs. 3 and 5) adapted to engage in the socketed ball connector conventionally provided at the trailing ends of the links 14. Also welded or otherwise rigidly attached to the bar 25 substantially centrally thereof are a pair of closely spaced parallel plates 28 defining an upright strut for connection with the trailing end of the top link 15. Such connection is effected by a pin 29 inserted through aligned apertures in the upper ends of the strut plates and through the usual socketed ball connector provided at the rear end of the link.

In the exemplary harrow, the bar 25 pivotally supports the disc gangs 11 and 12 in laterally aligned relation. Support for each gang is provided by a rigid depending arm 30 (Fig. 5) welded at its upper end to the bar adjacent the end thereof. To accommodate the pivotal movements of the associated gang, each of the arms 30 is provided at its lower end with a universally socketed ball 31 apertured for the reception of a pin 32. This pin is inserted through aligned apertures in a pair of upstanding lugs 33 provided on the associated gang as will appear presently.

Figure 3:
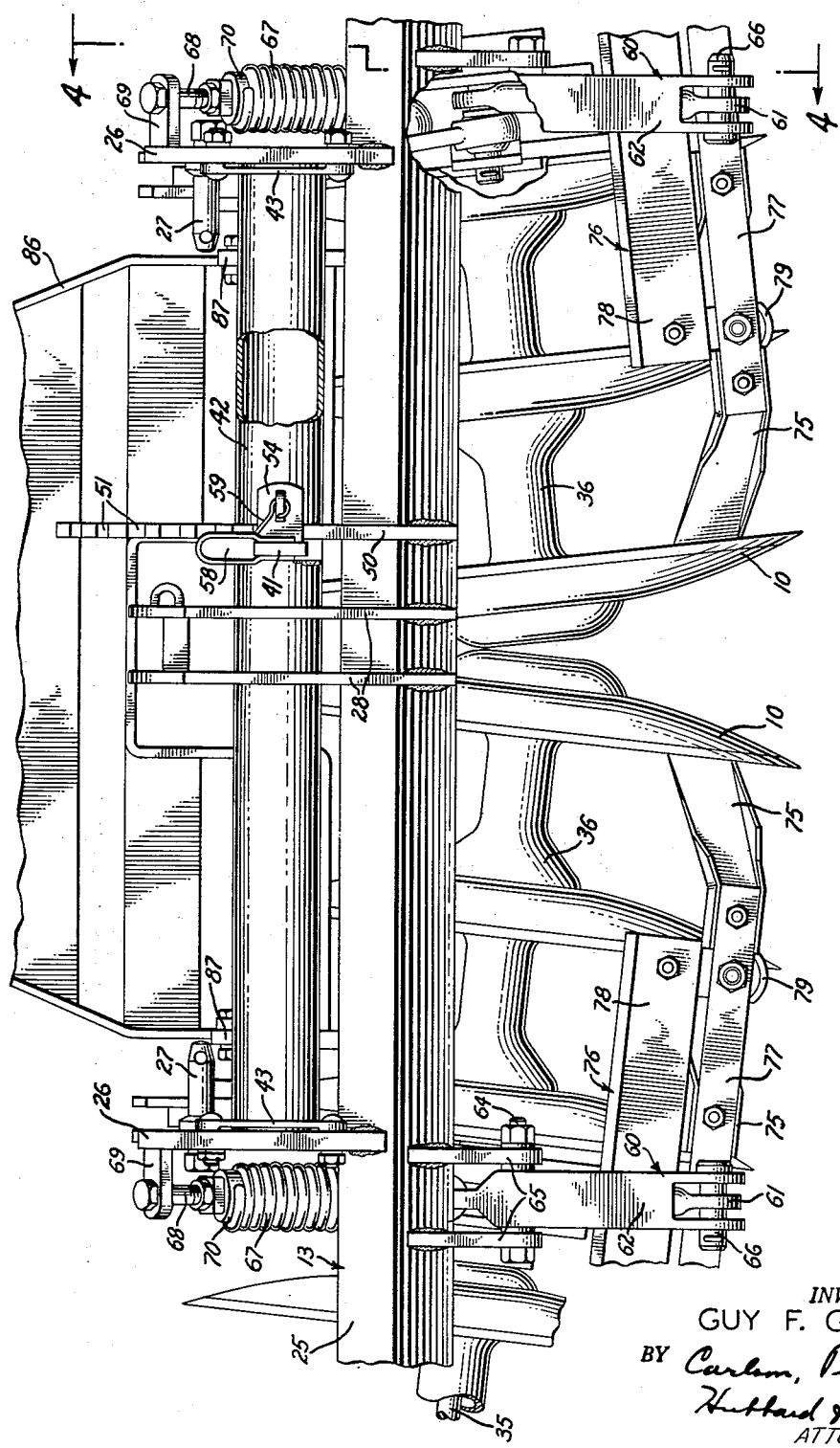
Fig. 3 is a fragmentary top view on an enlarged scale of the central portion of the harrow.

The disc gangs 11 and 12 may be of conventional construction, and, as they are alike, a description of one will suffice. As shown in Figs. 1 and 3, the discs 10 of each gang are axially spaced apart along a shaft 35 with suitable spacers 36 interposed between adjacent discs. In this instance the spacer at the center of the assembly carries the lugs 33 by which the gang is mounted on the arm 30, the lugs being welded or otherwise rigidly attached to the spacer in upstanding relation.

In accordance with one aspect of the invention provision is made whereby the tractor operator may adjust the angular disposition of the gangs 11 and 12 without dismounting from the tractor seat. Such adjustment is effected through the medium of a hand lever 40 pivoted on the harrow frame and so related to the other parts of the harrow that adjustment of the gangs through the full range of movement requires only a relatively short swing of the lever, thus making it easier and safer for the tractor operator to effect the desired adjustments. Furthermore the close coupling of the harrow to the tractor made possible by the construction shown brings the adjusting lever within easy reach of the operator.

Referring more particularly to Figs. 3 and 5 of the drawings, the hand lever 40, herein shown, has an elongated flat bar with a hand grip 41 at its outer end, and is welded or otherwise rigidly attached at its inner end to a transverse tubular rocker member 42. As herein shown, the rocker member is journaled at opposite ends in bearings 43 mounted on the inner faces of the brackets 26 which carry the coupling pins 27. These bearings are spaced rearwardly of the coupling pins but in front of the frame bar 25 as clearly shown in Fig. 5.

As will be apparent from the foregoing, the rocker member extends crosswise of the implement substantially beyond the inner ends of the two disc gangs. Rigidly attached to each end of the rocker member is a depending arm 44 (Figs. 4 and 5) connected at its lower end by a pin 45 with one end of a rigid link 46. As shown in Fig. 4, the other end of the link 46 is pivotally connected to the adjacent disc gang 11 or 12. This latter connection is effected through the medium of a pin 47 inserted through an aperture in the link and through aligned apertures in a pair of laterally spaced lugs 48 rigid with and upstanding from one of the spacers 36 of the gang.

By interposing the rocker member 42 in the adjusting mechanism in the manner above described, the adjusting connections with the disc gangs 11 and 12 may be located closer to their pivots than is practicable in conventional disc harrows. In this instance, as shown in Fig. 1, the connection with each gang is located only slightly more than half the distance from the gang pivot to the inner end of the gang. Accordingly, adjustment of the gangs between their straight or aligned and fully angled positions may be effected by rocking the hand lever 40 through a relatively small arc. This reduces the extent to which the tractor operator has to reach in adjusting the gangs and enables all adjustments to be made conveniently and with complete safety while the operator remains seated on the tractor.

Provision is made, of course, for locking the disc gangs 11 and 12 in any selected position of adjustment. The locking means may be of any preferred type, that shown comprising a segmental plate 50 disposed at one side of the lever 40 and welded at its lower edge to the frame bar 25. The upper edge of the plate 50 defines an arc centered on the pivotal axis of the lever 40 and is formed with a plurality of positioning notches 51 as shown in Fig. 5.

Mounted on the hand lever 40 for endwise sliding movement is a latch bolt 52 having its lower end bent outwardly for engagement in the notches 51. Support for the latch bolt is provided by a bracket 53 secured to the lever 40 and presenting a laterally projecting guide lug 54 apertured to slidably receive the bolt. A spring 56 interposed between the guide lug 54 and a collar 57 fixed on the bolt by a cotter pin 55 urges the latter downwardly or toward a locking position. Retraction of the bolt to release the hand lever for adjustment is effected by a grip lever 58 pivoted to the lever 40 adjacent its upper end and connected with the bolt by a link 59.

In accordance with another important aspect of the invention, novel mechanism is provided for automatically adjusting the pressure exerted on the inner ends of the disc gangs 11 and 12 so as to maintain them substantially level despite the tendency of the gangs to run shallower at their inner ends as is the case in harrows having discs faced for outward throw. Moreover, the improved pressure applying mechanism is constructed and arranged to automatically compensate for changes in the angles of the gangs, that is, to increase the downward pressure on the gangs progressively as the angling increases and thus maintain them in proper working position at all times.

In the exemplary harrow, a separate pressure adjusting mechanism is provided for each gang. This mechanism, in its preferred form, comprises generally a spring-biased lever 60 (Figs. 4 and 5) pivoted intermediate its ends on the implement frame and connected by a rigid thrust link 61 with the disc gang adjacent the inner end of the gang. The link and lever are so proportioned and related to each other and to the associated parts of the implement that they exert a progressively increasing downward pressure on the gang as the latter is swung from its substantially straight or aligned position to an angled position. Provision is also made for adjusting the pressure exerted by the mechanism on the disc gang in its straight or aligned position.

As will be seen by reference to Figs. 3-5 of the drawings, in the particular pressure applying mechanism shown, the lever 60 is in the form of a bell crank having arms 62 and 63 meeting at an angle of approximately 75°. This bell crank lever is pivotally supported at the junction of the two arms by a pivot pin 64 between a pair of spaced mounting lugs 65 secured to and projecting rearwardly from the frame bar 25. By reference to Fig. 3 it will be observed that the lugs 65 are located so as to position the lever 60 closely adjacent the outer face of the bracket 26 which carries certain parts of the mechanism to be described hereinafter.

The lever arm 62 is connected at its outer or rear end with the upper end of the thrust link 61 by a pivot pin 66. The lower end of the thrust link is connected to the adjacent disc gang 11 or 12 by the pin 47 which additionally serves to connect the adjusting link 46 with the gang. It will be understood that the lugs 48 on the disc spacer 36 of the gang are spaced apart sufficiently to accommodate both the link 46 and the link 61 between them. To avoid interference with the scraper blade supporting structure when the gang is in straight or aligned position, the thrust link 61 is bent into the angular configuration shown in Fig. 4.

The biasing on the link and lever organization to produce a downward thrust on the disc gang with which it is associated may be effected in any preferred manner. In the exemplary harrow the bias is applied by a coiled tension spring 67 connected between the lever arm 63 and an appropriate part of the implement frame. As herein shown, the connection with the implement frame is effected through the medium of a headed bolt 68 inserted through a clearance aperture in an outwardly projecting lug 69 welded or otherwise rigidly attached to the pin supporting bracket 26. The bolt 68 is threaded into an anchor fitting 70 suitably attached to the end of the spring 67. At its other end the spring 67 is formed with a hook 71 adapted to engage in a hole in the lower end of the lever arm 63.

The spring 67 is dimensioned, of course, so that it exerts a pull on the lever arm 63, tending to rock the bell crank lever 60 counterclockwise (as viewed in Fig. 4), and thus exert a downward thrust on the disc gang through the thrust link 61. The amount of such thrust produced when the disc gang is in the straight or aligned position may be adjusted by screwing the bolt 68 into or out of fitting 70. A jamb nut 72 serves to lock the parts in adjusted position.

As is well known, the ground reaction on the inner ends of disc gangs arranged for outward throw increases as the gangs are angled, such ground reaction tending to raise the discs at the inner ends of the gangs. The improved pressure applying mechanism above described automatically compensates for this change in ground reaction and increases the downward thrust on the gangs progressively to counteract the same, and thus maintain the gangs level in all operating positions. Such automatic compensation is attained through the novel proportioning and relationship of the parts of the mechanism and their relation to the associated parts of the harrow. Thus as will be seen by reference to Fig. 4 of the drawings, the harrow is constructed so that the disc supporting shafts 35 of the gangs, when aligned, lie almost directly below the frame bar 25. The bell crank lever 60 of the pressure applying mechanism is pivoted on a supporting lug which extends rearwardly from the frame bar and, furthermore, the lever is oriented so that its arm 62 normally extends generally horizontally a substantial distance to the rear of the frame bar. Accordingly, the thrust link 61, which connects the end of the lever arm 62 with the disc gang, is inclined downwardly and forwardly when the gangs are in aligned position, the inclination being approximately 45° in the specific implement illustrated.

As the inner end of the disc gang swings rearwardly (to the left as viewed in Fig. 4), it will be apparent that the angle of inclination of the link 61 will become steeper, and, since the link is rigid, either end of the disc gang will be pushed down or the lever 62 will be rocked upwardly depending upon the relation of the downward pressure exerted by the spring 67 to the ground reaction tending to raise the inner end of the gang. In practice, the spring and lever are proportioned to exert sufficient downward pressure on the inner end of the gang to maintain it substantially level or horizontal in any angled position in which the gang is working.

Reference has been made heretofore to the scraper mechanism which constitutes an element of the improved harrow. One such mechanism is provided for each of the disc gangs 11 and 12, each mechanism comprising a series of scraper blades 75 mounted in spaced relation on a supporting structure 76 extending longitudinally of the associated gang above and slightly to the rear of the discs 10. Scraper blades are secured at their upper ends to the supporting structure and are inclined relative thereto so that their lower ends are in scraping engagement with the concave faces of the respective discs.

Figure 6:
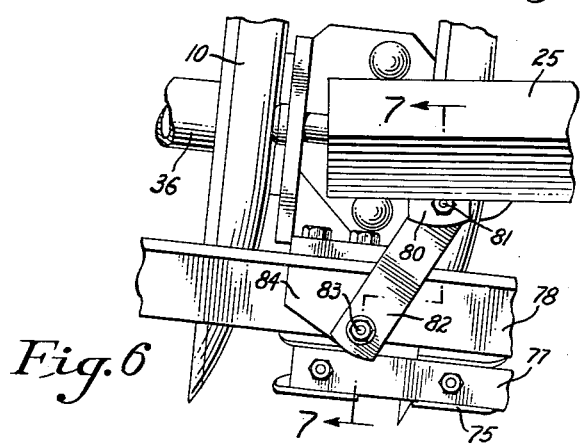
Fig. 6 is an enlarged fragmentary top view of the harrow showing details of the scraper supporting structure.

The scraper supporting structure as herein shown is made up of two parts, namely, an elongated flat bar 77 (Figs. 3 and 6) and an angle bar 78 disposed in parallel relation and interconnected by cross members 79. The scraper blades 75 are bolted to the bar 77. The angle bar 78 is supported on the associated disc gang and is also connected to the implement frame to limit the horizontal pivoting of the gang to a generally fore-and-aft axis without interfering with the pivoting of the gang about its vertical axis.

As shown in Fig. 7, the connection with the frame above referred to is effected through the medium of a bracket 80 welded to the frame bar 25 and projecting rearwardly therefrom. Pivotally secured at one end to the bracket 80 by a bushed pivot bolt 81 is a link 82. The other end of this link is secured, as by a bushed pivot bolt 83, to an angle bracket 84 bolted to the upstanding flange of the angle bar 78.

Connection of the scraper supporting structure with the disc gang is made at two or more points spaced apart longitudinally of the gang. Each connection is effected through the medium of an L-shaped bracket 85 (Fig. 4) having one arm bolted or otherwise attached to one of the spacers 36 of the gang. The other arm of the bracket is directed upwardly and is bolted to the upright flange of the angle bar 78. With this arrangement the scraper mechanism is held in rigid alignment with the associated disc gang, while connection with the implement frame serves to limit the gang to rocking movement about vertical and horizontal fore-and-aft axes. In other words, the latter connection restrains or limits the pivotal movements of the gang to a transverse rocking for following ground contour and to a pivotal movement on a vertical axis for angling the gang.

With the construction above described, the pivotal connections of the gangs 11 and 12 with the frame structure of the implement are located outside of the tractor wheel tread. As the inner ends of the gangs are shifted rearwardly in the angling of the gangs, this permits the harrow to be coupled very closely to the tractor. As a result, the harrow imposes a minimum of overhanging weight on the tractor when it is raised to transport position.

The particular organization of the harrow elements, and, in particular, location of the gangs directly below the frame bar 25, results in a very compact implement, and is also advantageous in adapting the harrow for transmitting adequate draft control forces through the top link 15 of the hitch linkage to the tractor control mechanism. The effectiveness of this control is further enhanced by providing a weight box 86 adapted to carry extra weight and located so as to substantially counterbalance the weight of the disc gangs with reference to the pivotal connection of the implement with the hitch links 14. The weight box 86 as shown in Figs. 3 and 5 is in the form of a latticed tray secured in forwardly projecting relation to the frame bar 25 by depending brackets welded to the frame bar.

It will be apparent from the foregoing that the invention provides a disc harrow of novel and advantageous construction, particularly characterized by its simplicity and ruggedness. The improved harrow is adapted to be closely coupled to a tractor having a conventional three-point hitch linkage. This close coupling, together with the novel angling adjustment provided, enables the operator of the tractor to adjust the gangs through their full range of movement with convenience and safety while seated on the tractor. In this connection, it is particularly important to note that the improved adjusting mechanism requires a minimum swing of the adjusting lever which reduces the extent to which the tractor operator has to reach in effecting the adjustments, thus greatly facilitating the operation.

The operating efficiency of the harrow is materially increased by the novel mechanism provided for maintaining sufficient downward thrust on the inner ends of the gangs to resist the tendency of the gangs to rise through the soil reaction thereon. Of particular importance in this respect is the arrangement whereby the downward thrust on the gangs is automatically adjusted to compensate for the increased ground reaction encountered as the angle of the gangs is increased. In other words, the improved mechanism automatically compensates for the changes in the angling of the discs and maintains them level at any position in which they are required to work.

I claim:

1. In a disc harrow, in combination, a rigid frame including a depending arm, a disc gang pivoted intermediate its ends on the lower end of said arm to swing about a vertical axis having a transverse position and an angled position, means for exerting a downwardly directed force on one end of the gang comprising a lever pivoted on said frame and projecting rearwardly therefrom a substantial distance behind the pivot of said gang, a connecting element on said gang spaced from its pivot, a link connecting the projecting end of said lever to said element, said lever being dimensioned so that said link extends downwardly and forwardly therefrom when the gang is in transverse position, and a spring interposed between said lever and said frame urging said lever in a direction effective to impose a downward thrust on the gang through said link, said link swinging toward a vertical position as the gang is angled to increase the downward thrust on the gang.

2. In a disc harrow, in combination, a frame including an elongated rigid bar, an arm depending from said bar, a disc gang mounted on said arm to pivot about a vertical axis between a straight position generally parallel with said frame bar and an angled position with one end of the gang located rearwardly of the frame bar, a first bracket rigid with said frame bar and projecting rearwardly therefrom, a bell crank lever pivoted intermediate its ends on said bracket, said lever having one arm extending rearwardly and the other arm extending forwardly and downwardly from its pivot on the bracket, a rigid thrust link connecting said one arm of the lever with said disc gang, a second bracket rigid with said frame bar and projecting forwardly therefrom at one side of said lever arm, a spring anchored at one end to said second bracket and at the other end to said other lever arm, said spring urging said lever in a direction to apply a downward thrust on the gang through said thrust link, and adjusting means for varying the force exerted by said spring on said lever and said link.

3. In a disc harrow, in combination, a rigid frame including a depending arm, a disc gang pivoted intermediate its ends to the lower end of said arm, said gang having a longitudinally extending supporting member disposed above and slightly to the rear of the discs of the gang, means for exerting a downwardly directed thrust on one end of said gang comprising a lever pivoted on said frame and projecting rearwardly therefrom a substantial distance behind the pivot of the gang, a rigid thrust link pivotally connected to the projecting end of said lever and to said gang at a point substantially below said supporting member, said link having its intermediate portion offset to clear the supporting member when the gang is disposed generally parallel to the frame, and spring means interposed between the frame and said lever operative to urge the lever in a direction to exert a downward thrust on the gang through said link.

References Cited in the file of this patent

UNITED STATES PATENTS

| | | |
|---|---|---|
| 418,300 | Wilson | Dec. 31, 1889 |
| 540,550 | Hilse | June 4, 1895 |
| 799,607 | Lindgren | Sept. 12, 1905 |
| 895,259 | Gresham | Aug. 4, 1908 |
| 1,568,896 | McKay | Jan. 5, 1926 |
| 2,264,783 | White | Dec. 2, 1941 |
| 2,596,579 | McKay | May 13, 1952 |
| 2,675,659 | Kopp | Apr. 20, 1954 |